United States Patent [19]

Sasayama et al.

[11] Patent Number: 6,118,046
[45] Date of Patent: Sep. 12, 2000

[54] INBRED BROCCOLI LINE KI-13 CAPABLE OF COMBINING WITH OTHER INBRED BROCCOLI TO PRODUCE SUPERIOR COMMERCIAL CULTIVAR (VARIETIES)

[75] Inventors: Junichi Sasayama, Kakegawa; Keiichi Yoneda, Sodegaura; Miki Itakura, Kisarazu, all of Japan

[73] Assignee: Sakata Seed Corporation, Yokohama, Japan

[21] Appl. No.: 08/658,793

[22] Filed: Jun. 5, 1996

Related U.S. Application Data

[60] Provisional application No. 60/000,597, Jun. 30, 1995.

[51] Int. Cl.$^7$ ............................. A01H 5/00; A01H 5/10; A01H 1/04; A01H 4/00
[52] U.S. Cl. ..................... 800/200; 800/205; 800/250; 800/255; 800/DIG. 15; 47/DIG. 1
[58] Field of Search .................................. 800/200, 205, 800/250, 255, DIG. 15; 47/58, DIG. 1; 435/430

[56] References Cited

PUBLICATIONS

Hanson et al. Regeneration of plants from protoplasts of rapid cycling *Brassica oleracea* L. Plant Cell Reports. 13:335–339, 1994.

*Primary Examiner*—Douglas W. Robinson
*Assistant Examiner*—Melissa L. Kimball
*Attorney, Agent, or Firm*—Rothwell, Figg, Ernst & Kurz

[57] ABSTRACT

An inbred broccoli line, designated KI-13, including to the seeds to the plants, the method of development of inbred broccoli line KI-13, and the methods for producing a broccoli plant produced by crossing the inbred line KI-13 with itself or other broccoli lines. The genetic makeup of KI-13 enables either self-incompatibility or male sterility used for pollination control to effect hybridization. The hybrid broccoli seeds and plants can also be produced by crossing the inbred line KI-13 with another broccoli line.

16 Claims, No Drawings

INBRED BROCCOLI LINE KI-13 CAPABLE OF COMBINING WITH OTHER INBRED BROCCOLI TO PRODUCE SUPERIOR COMMERCIAL CULTIVAR (VARIETIES)

This application claims the benefit of U.S. Provisional Application No. 60/000,597, filed Jun. 30, 1995.

BACKGROUND OF THE INVENTION

This invention relates to a new and distinctive broccoli inbred line, designated KI-13.

There are numerous steps involved in the development of any new and novel, desirable plant germplasm with superior combining ability. Plant breeding begins with the analysis and definition of problems and weaknesses of the current germplasm, the establishment of program goals, and definition of specific breeding objectives. The next step is selection of germplasm that possess the traits to meet the program goals and the best breeding method to reach those goals. The objective is to combine in a single variety or hybrid an improved combination of desirable traits from the parental germplasm. These important characteristics may include higher yield, better flavor, improved color and field holding ability, resistance to diseases and insects along with economic seed yields to facilitate the cost of hybrid seed production.

The method chosen for breeding or selection depends on the mode of plant reproduction, the heritability of the trait(s) being improved, and the cultivar (variety) used commercially (e.g. $F_1$ hybrid, pureline). The complexity of inheritance influences the choice of breeding method. One method of identifying a superior plant is to observe its performance relative to other experimental plants and to a widely grown standard cultivar. If a single observation is inconclusive, observation in multiple locations and seasons provide a better estimate of its genetic worth.

The development of commercial broccoli hybrids requires the development of homozygous inbred lines. Breeding programs combine desirable traits from two or more germplasm sources from which various broad based breeding gene pools are used to develop inbred lines by self-pollinating followed by selection of desired phenotypes sometimes utilizing anther, microspore and ovule culture to speed up and improve selection efficiency.

Description of breeding methods that are commonly used for different traits and crops can be found in one of several reference books (e.g. Allard, "Principles of Plant Breeding", 1960; Frey, "Plant Breeding II", 1981; Tsunoda, et. al., "Brassica Crops and Wild Allies", 1980).

Proper testing and evaluation should detect any major faults and establish the level of superiority or improvement over current cultivars (varieties). In addition to showing superior performance, there must be a demand for a new cultivar that is compatible with industry standards or which creates a new market. For seed-propagated cultivars (varieties), it must be feasible to maintain the inbred lines and produce seed easily and economically.

Broccoli is a new crop in North, South and Central America, Europe and Asia. The introduction of hybrid cultivars in the 1960's provided a magnitude increase in yield, holding ability, expanded growing seasons and large scale production of broccoli. The goal in broccoli breeding is to make continued improvement in hybrid broccoli yields and horticultural characteristics in order to sustain the supply to meet continuous increase in demand for broccoli in developed and emerging world economies. To accomplish this goal new breeding methods such as anther culture and microspore culture have been utilized to more rapidly generate inbred broccoli lines from more diverse germplasm sources.

Broccoli (*Brassica oleracea*, Italica group) belongs to the mustard family. All *Brassica oleracea* will cross pollinate. Pollination is effected by insect vectors, most common of which is the honey bee. Broccoli, like most other brassica, have a genetic characteristic of self incompatibility which encourages cross pollination resulting in higher levels of variability. Variability in populations is desired for wide adaptation and survival. Broccoli breeding populations can be inbred for 8 to 9 generations and/or use doubled haploids derived from anther culture to develop homozygous inbred lines. Broccoli $F_1$ hybrids can be produced by using self-incompatibility or cytoplasmic male sterility to control pollen movement between selected inbred lines.

Self-incompatibility is a breeding system that enforces out-crossing and therefore maximizes recombination in cross pollinated species. This breeding system in nature has been utilized by man in $F_1$ hybrid breeding, especially in brassica vegetables (Tsunoda et al, 1981, chapter 13). The stigma of brassica flowers is the site of the incompatibility reaction. Compatible pollen tubes pierce the cuticle layer of the stigma and grow down the style tissue. When incompatible pollen grains germinate on the stigma, some pollen tubes can penetrate the cuticle layer but the penetrated tubes can not grow down the style. "Bud pollination" is done to overcome the self-incompatibility in order to maintain inbred broccoli lines. Young buds of inbred broccoli and other brassica can be fertilized by incompatible (self) pollen. Unlike mature stigmas, the young stigmas cannot discriminate between compatible and incompatible pollen. Therefore bud pollination by hand will produce selfed seed on inbred broccoli, thereby maintaining the self-incompatibility needed for hybrid seed production.

Male sterility is another method used in brassica vegetable species to produce $F_1$ hybrids. This method of producing hybrids in Brassica is a more recent development compared to self-incompatibility.

The plants associated with the Brassica group have been familiar to mankind since ancient times, and have always been of great agricultural importance. Brassica is a major food species world wide. Brassica species have a general adaptation for cool climate growing conditions. Therefore adaptation has occurred in summer growing conditions with cool to moderate climates and to winter growing conditions in warmer or tropical locations.

SUMMARY OF THE INVENTION

The invention comprises a novel inbred broccoli line, designated KI-13. This invention includes the seeds of inbred broccoli line KI-13, the plants of inbred broccoli line KI-13, methods used for controlling pollination when making hybrid seed with KI-13, and methods for producing a broccoli plant by crossing the inbred broccoli line KI-13 with itself or another broccoli line. This invention further includes hybrid broccoli seeds, and plants produced by crossing the inbred line KI-13 with another broccoli line.

DETAILED DESCRIPTION OF THE PREFERRED EMBODIMENTS

Inbred broccoli KI-13 is a heading type broccoli (*Brassica oleracea* Italica group) with superior characteristics, and provides an excellent parental line in crosses for producing first generation ($F_1$) hybrid broccoli.

Inbred broccoli KI-13 was developed from anther culture at the Sakata Seed Corporation, Biotechnology Center, Kimitsu Japan.

The inbred has shown uniformity and stability for all traits, as described in the following variety description information. The line has been increased by self (bud) pollination with continued observation for uniformity.

The inbred broccoli line KI-13 has the following morphologic and other characteristics.

VARIETY DESCRIPTION INFORMATION

A. Maturity: medium maturity, 70–85 days.

B. Plant Characteristics
  Habit: compact
  Plant Height: 30 cm
  Leaves: 26 cm average length at mid-point of the plant, 19 cm width at midpoint of the plant, 2:1 length to width ratio
  Leaf Margins: wavy
  Veins: thin
  Petiole Length: 14 cm
  Petiole Attachment: sissile and petiolate Anthocyanin Coloration: none present
  Inflorescence: Medium flower bud size, yellow flowers, no marketable side sprouts after head harvest, 15 cm center head diameter, 7 cm center head depth, 3 cm diameter of stem base of head, medium compactness of center head, bluish green center head color
  Disease Resistance: None claimed D. Other Characteristics
  1. Features of KI-13 During Selection are listed in Appendix A.
  2. The Breeding History of KI-13 in Japan is set forth in Appendix B.
  3. The Combining Ability of KI-13 is set forth in Appendix C.

Electrophoresis profiles of inbred broccoli KI-13 using 12 stains and three electrophoresis systems were performed. KI-13 lot W7133 was utilized and hybrid broccoli Arcadia was used as a check. Seed was used for all stains except Acid Phosphatase (APS) where 4-day old cotyledons were examined.

The following stains were used on the starch gel electrophoresis system:
  (LAP) Leucineamino peptidase
  (GOT) Glutamate oxoacetate transaminase
  (PGI) Phosphoglucose isomerase
  (PGM) Phosphoglucomutase
  (SKDH) Shikimate dehydrogenase
  (BPGD) B-phosphogluconic dehydrogenas
  (ACO) Aconitase
  (MHD) Malate dehydrogenase The following stains were used on the isoelectric focusing system:
  (DIA) Diaphorase
  (ADH) Alcohol dehydrogenase
  (IDH) Isocitric dehydrogenase One stain was used on the cellulose acetate system:
  (APS) Acid phosphatase This invention is also directed to methods for producing a broccoli by crossing a first parent broccoli plant with a second parent broccoli plant, wherein the first or second broccoli plant is the inbred broccoli from the line KI-13. Further, both first and second parent broccoli plants may be from the inbred line KI-13. Therefore, any methods using the inbred broccoli line KI-13 are part of this invention: selfing, backcrosses, hybrid breeding, crosses to populations, anther culture, ovule culture, male sterility and somaclonal variation selection. Any plants produced using the inbred broccoli as a parent are within the scope of this invention. Advantageously, the inbred broccoli line is used in crosses with other broccoli varieties and lines to produce first generation ($F_1$) broccoli hybrid seed and plants with superior characteristics.

Seed deposited with the American Type Culture Collection on Feb. 20, 1996, has been accorded ATCC Designation Number 97449.

As used herein, the term "plant" includes plant cells, plant protoplasts, plant cells of tissue culture from which broccoli plants can be regenerated, plant calli, plant clumps, and plant cells that are intact plants or parts of plants, such as pollen, flowers, seeds, stalks, stumps, leaves, and the like. Thus, another aspect of this invention is to provide for cells which upon growth and differentiation produce the inbred broccoli KI-13.

Although the foregoing invention has been described in some detail by way of illustration and example for purposes of clarity and understanding, it will be obvious that certain changes and modifications may be practiced within the scope of the invention, as limited only by the scope of the appended claims.

---

APPENDIX A
Features of "KI-13" During Selection

| Year | Description |
|---|---|
| 1979 | 9901-8 |
|  | Non-uniform, green colored head, good line. |
| 1980 | 9901-8-23 |
|  | Dark green leaf, slight erect habit, no sideshoots, small head, extended stem habit. |
| 1981 | 9901-8-23-6 |
|  | Slightly tall plant height and easy to lodge. Tolerant to downy mildew, head color segregating. |
| 1982 | 9901-8-23-6-3 |
|  | Extended stem habit and small head. |
| 1983 | 9901-8-23-6-3-1 |
|  | Early and flat head. |
| 1984 | KMR-1-8-23-6-3-1-4 |
|  | Flat head, good holding ability. |
| 1985 | KMR-1-8-23-6-3-1-4-1 |
|  | Good holding ability. |
| 1986 | Suspend selection by selfing. |
| 1987 | KHR-1-8-23-6-3-1-4-1-2 |
|  | Still suspended selection, but generation was advanced as crossing parent. |
| 1988 | KMR-1-8-23-6-3-1-4-1-2-2 |
|  | Start to select again, extended stem habit, no sideshoots, smooth stem. |
| 1989 | KMR-1-8-23-6-3-1-4-1-2-2-4 |
|  | Big head, tight, head position is very high. |
| 1990 | KMR-1-8-23-6-3-1-4-1-2-2-4-16 (KMR-1-8-30) |
|  | Big and very smooth head, small and even beads. |
| 1991 | KHR-1-8-30 |
|  | Use anther culture (double haploid method). |
| 1992 | KI-13 (KMR-1-8-30-6-22) |
|  | Stem has quite a lot of extension, head position is very high, no sideshoots. Big and smooth head, good dome shape, small bead, tight, good holding ability. |

APPENDIX B
History of Broccoli "KI-13" (SSC)

| Date | Event |
|---|---|
| 7/5/79 | Sakata Seed Corporation, Yokohama, Japan received this line from Junichi Obara, Sakata Seed America. |
| 7/13/79 | Breeder received this line from the SSC head office. This line was given SSC code 9901-8. |
| 7/25/79 | Sown at Kimitsu and selected 35 plants from this line. |

-continued

| | |
|---|---|
| Spring 1980 | Checked Self-Incompatibility (SI) of selection plants. |
| 7/25 and 7/31/80 | Sown for characteristics and field tolerance to downy mildew selection for 9901-8-23. Selected 14 plants. |
| Spring 1981 | Checked SI of selection plants. |
| 7/25/81 | Sown, selection for 9901-8-23-6, selected 7 plants, evaluated downy mildew degree in field. |
| Spring 1982 | Checked SI of selection plants. |
| 7/25/82 | Sown 9901-8-23-6-3 and selected 6 plants from population. |
| Spring 1983 | Checked SI of selection plants. |
| 7/23/83 | Sown 9901-6-23-6-3-1 and selected 6 plants. |
| Spring 1984 | Checked SI of selection plants. |
| 7/25/84 | Sown 9901-6-23-6-3-1-4. Changed line name to KHR. Selected 5 plants. KMR = Kimitsu Mildew Resistance. |
| Spring 1985 | Checked SI of selection plants. |
| 7/25/85 | Sown KHR-1-8-23-6-3-4-1 and continued to select for good characteristics. Selected 2 plants. |
| Spring 1986 | Checked SI of selection plants. Suspend selection because line did not stabilize after seven years of inbreeding and selection. |
| 9/7/87 | Sown KMR-1-8-23-6-3-1-4-1-2 1985 as material for crossing parent. Superior plants selected. |
| Spring 1988 | Checked SI of selected plants. |
| 7/25/88 | Sown KMR-1-8-23-6-3-1-4-1-2-2 and 10 plants selected for anther culture purpose. |
| Spring 1989 | Checked SI of selection plants. |
| 7/25/89 | Sown KMR-1-8-23-6-3-1-4-1-2-2-4 and 16 plants selected. |
| Spring 1990 | Checked SI of selection plants. |
| 7/30/90 | Sown KMR-1-8-23-6-3-1-4-1-2-2-4-16 and 8 plants selected. Used 389-6 (KMR-1-8-23-6-3-1-4-1-2-2-4-16-6) for anther culture and named this line as KMR-1-8-30. |
| Spring 1991 | Checked SI of selection plants. |
| 7/16/91 | Received report from Kimitsu Bio Center regarding anther culture process of 389-6. |
| Spring 1992 | Received 34 lines through anther culture of 389-6. |
| 7/1/92 | Sown and inoculated downy mildew and evaluated degree of disease tolerance. |
| 8/3/92 | Sown and selection for characteristics, selected 389-6-22 and named KI-13. |
| Spring 1993 | Checked SI of KI-13 (8/3/92, sown). |
| Summer 1993 | Sown and evaluated KI-13 in Japan and U.S.A. |
| 9/16/93 | Sown as crossing parent (Kakegawa Research Station). |
| Spring 1994 | Checked SI of KI-13 (9/16/93, sown). |
| Summer 1994 | Sown and evaluated in Japan. |

APPENDIX C
Combining Ability of "KI-13"

1. 7/19/93 sown, 8/27/93 transplanted at Salinas Research Station.
Rating Method: 1–5 where 5 = best

| Variety | Overall Rating | Comments |
|---|---|---|
| Line P x KI13 | 2.67 | Small bead, semi-dome, tight, DMMR, head up, pale color. |
| Line P x KI557 | 2.00 | Lumpy, small bead, tight, heavy, little bit head up. |
| Line P x KI640 | 2.17 | Small bead, lumpy, dwarf, DMMR. |
| Line P x KI764 | 2.17 | Slightly loose, light, semi-flat, pale color, lumpy. |
| Line PK x KI13 | 3.67 | Semi-flat, good uniformity, early, slightly open habit, DMMR, uneven beads. |
| Line PK x KI557 | 2.33 | Uneven beads, slightly light, flat, tight. |
| Line PK x KI764 | 1.83 | Semi-flat, loose, uneven beads, medium bead. |
| KI-13 x Line KB | 3.33 | Dome, small bead, slightly uneven bead, slightly lumpy, tight, head up. |
| KI-557 x Line KB | 2.33 | Flat, lumpy, head up. |
| KI-764 x Line KB | 1.50 | Uneven bead, large bead, semi-flat, lumpy, small bead, uneven bead, dome. |
| KI-13 x Line N | 2.27 | Flat, uneven bead, tight, medium bead, dwarf. |
| K1640 x Line N | 1.75 | Large bead, lumpy, semi-dome, head up, heat damage. |
| K1764 x Line N | 2.00 | Small bead, loose, dome, dwarf. |
| Green Valiant (control) | 2.50 | Head button, small bead, dwarf, lumpy, DMS. |

2. 8/1/94 sown, 9/6/94 transplant at Salinas Research Station.

| | | |
|---|---|---|
| Line C x KI13 | 2.80 | Pale color, smooth, good uniformity, thin stem. |
| Line C x KI617 | 1.50 | Small bead, pale color, head up, loose, semi-flat. |
| Line C x KI640 | 1.00 | DMS, head up, non-uniform, loose, lumpy, many sideshoots. |
| KI-13 x Line 35 | 2.80 | Dome, easy to lodge, slightly head up, good shape, lumpy, thin stem. |
| KI-516 x Line 35 | 2.50 | Head button, dome, easy to fall down, lumpy, good uniformity. |
| KI-607 x Line 35 | 2.00 | Lumpy, tight, head bottom, small bead, good shape, semi-flat, thick stem. |
| Line G x KI-13 | 4.00 | Slightly thin stem, good uniformity, dome, small bead, tight. |
| Line G x KI-516 | 2.20 | Lumpy, small bead, dome, leafy, DMS. |
| Line G x KI-617 | 1.50 | Lumpy, small bead, non-uniform, many sideshoots, DMMR. |
| Line G x KI-752 | 2.20 | Lumpy, irreguiar shape, slightly dwarf, medium bead, many sideshoots, dome. |
| Line G x KI-828 | 2.00 | Head up, light, flat, lumpy, small bead, good color. |
| Line I x KI-13 | 3.50 | Pale color, slightly open habit, small bead, head up, thin stem, semi-flat, good uniformity. |
| Line I x KI-617 | 2.50 | Compact, tight, dome, small bead, pale color, thick stem. |
| Line I x KI-640 | 1.50 | Dwarf, leafy, semi-flat, loose, small bead, pale color, many sideshoots. |
| Green Valiant (control) | 2.00 | Dwarf, small bead, lumpy, DMS. |

7/20/93 sown at Kakegawa Research Station in Japan.

| | | |
|---|---|---|
| Line P x KI-13 | 2.50 | Tight, large head, head up, medium bead, good color. |
| Line P x KI-557 | 1.00 | Flat, irregular shape. |
| Line P x KI-828 | 1.00 | Semi-flat, lumpy, small bead, good uniformity. |
| Line KB x KI-13 | 2.50 | Head up, no sideshoots, good color, small bead, tight, smooth. |
| Line KB x KI-539 | 1.00 | Flat, irregular shape, head up. |
| Line KB x KI-552 | 1.00 | Head up, lumpy, even bead, loose. |

8/4/93 sown at Kakegawa Research Station in Japan.

| | | |
|---|---|---|
| Line 38 x KI-13 | 4.00 | Smooth, small bead, open habit, large head. |
| Line 38 x KI-539 | 1.00 | Loose, flat. |

-continued

| | | |
|---|---|---|
| Line C x KI-13 | 3.00 | Head up, semi-flat. |
| Line C x KI-557 | 1.00 | Irregular shape, small bead, good uniformity, head up. |
| Line C x KI-427 | 1.00 | Smooth, loose, pale color. |
| Line IF x KI-13 | 3.00 | No sideshoots, head up. |
| Line IF x KI-30 | 1.00 | Flat, irregular shape. |
| Line IF x KI-640 | 1.00 | Irregular shape. |
| Line G x KI-13 | 4.00 | Tight, head up, large head. |
| Line G x KI-30 | 1.00 | Irregular shape. |
| Line I x KI-13 | 3.50 | Dome, smooth, large bead. |
| Line I x KI-640 | 1.00 | Head up, irregular shape. |
| Line I x Ki-764 | 1.00 | Vigorous, head up. |
| 7/15/94 sown at Kakegawa Research Station in Japan. | | |
| KI-13 x Line KB | 2.50 | Open habit, large head, small bead, extended stem. |
| KI-764 x Line KB | 1.00 | Lumpy, dome, loose. |
| Line 38 x Line KB | 1.00 | Very small bead, irregular shape. |
| KI-828 x KI-13 | 3.50 | Slightly open habit, good uniformity, head up, slightly light. |
| KI-828 x KI-22 | 1.00 | Lumpy, tight. |
| KI-828 x Line KB | 1.00 | Small head, irregular shape. |
| KI-828 x Line G | 1.00 | Semi-flat, head up. |
| 8/4/94 sown at Kakegawa Research Station in Japan. | | |
| Line U x KI-13 | 2.50 | Vigorous, smooth, dome, very large head. |
| Line U x KI-22 | 1.00 | Large head, lumpy. |
| Line U x Line KB | 1.00 | Smooth, medium bead. |
| Line 28 x KI-13 | 2.50 | Head up, semi-flat, no shideshoots, irreguiar shape. |
| Line 28 x Lind 35 | 1.00 | Irregular shape, flat. |
| Line 28 x KI-22 | 1.00 | Irregular shape, lumpy. |

What is claimed is:

1. Inbred broccoli seed designated KI-13 having American Type Culture Collection accession No. 97449.

2. A broccoli plant or its parts produced by growing seed of claim 1.

3. Pollen of the plant of claim 2.

4. An ovule of the plant from claim 2.

5. An inbred broccoli plant having all the physiological and morphological characteristics of the broccoli plant of claim 2.

6. A method of producing first generation ($F_1$) hybrid broccoli seed comprising the steps of crossing a first parent broccoli plant with a second parent broccoli plant, and harvesting the resultant first generation ($F_1$) hybrid broccoli seed, wherein at least one of said first and second parent broccoli plants is the broccoli plant of claim 2.

7. The method of claim 6 wherein said at least one of said first and second parent broccoli plants is the female parent.

8. The method of claim 6 wherein said at least one of said first and second parent broccoli plants is the male parent.

9. A first generation ($F_1$) hybrid broccoli plant produced by growing the hybrid broccoli seed obtained by the method of claim 6.

10. The method of claim 6 wherein said at least one of said first and second parent broccoli plants uses self-incompatibility as a means for hybridization.

11. The method of claim 6 wherein said at least one of said first and second parent broccoli plants uses male sterility as a means for hybridization.

12. Tissue culture of the broccoli plant of claim 2.

13. A broccoli plant regenerated from the tissue culture of claim 12.

14. A hybrid broccoli seed produced by the method of claim 6.

15. A hybrid broccoli plant or its parts produced by growing said hybrid broccoli seed of claim 14.

16. Seed produced from said hybrid broccoli plant of claim 15.

* * * * *